United States Patent
McNamee et al.

(10) Patent No.: US 12,361,612 B2
(45) Date of Patent: *Jul. 15, 2025

(54) SYSTEMS AND METHODS FOR TIMELINE VISUALIZATION

(71) Applicant: Kinaxis Inc., Ottawa (CA)

(72) Inventors: Louis McNamee, Ottawa (CA); Jérémie Boudin, Ottawa (CA); Delisia Philip, Ottawa (CA); Ivy Blackmore, Ottawa (CA); Prabhakar Regmi, Ottawa (CA); Sriprasadh Raghunathan, Ottawa (CA); Baz Ramadhan, Ottawa (CA)

(73) Assignee: Kinaxis Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/598,982

(22) Filed: Mar. 7, 2024

(65) Prior Publication Data
US 2024/0212238 A1    Jun. 27, 2024

Related U.S. Application Data

(63) Continuation of application No. 17/245,763, filed on Apr. 30, 2021, now Pat. No. 11,954,771.
(Continued)

(51) Int. Cl.
*G06T 11/20* (2006.01)
*G06F 40/106* (2020.01)
(Continued)

(52) U.S. Cl.
CPC .......... *G06T 11/206* (2013.01); *G06F 40/106* (2020.01); *G06Q 10/0633* (2013.01); *G06T 11/001* (2013.01); *G06T 11/60* (2013.01)

(58) Field of Classification Search
None
See application file for complete search history.

(56) References Cited

U.S. PATENT DOCUMENTS

| 1,289,388 | A  | 12/1918 | Calleson |
| 7,180,516 | B2 | 2/2007  | Kapler et al. |

(Continued)

OTHER PUBLICATIONS

Jennifer Cherwinka, "Top Timeline tips in Visio", posted Oct. 8, 2012, https://www.microsoft.com/en-us/microsoft-365/blog/2012/10/08/top-timeline-tips-in-visio/ (Year: 2012).*
(Continued)

*Primary Examiner* — Sarah Le
(74) *Attorney, Agent, or Firm* — Borden Ladner Gervais, LLP

(57) ABSTRACT

Systems and methods of timeline visualization that define a table structure which represents supply chain management actions in a generic way. The content of the table is then processed by the timeline visualization to extract the entities, events, their relationships, and their attributes. These entities are transformed into time axes, while the events are transformed into a visual representation of their attributes using color, shapes, and text labels. The events may be positioned on a canvas, above or below a timeline axis, depending on whether they are upstream or downstream events, using a layout module which determines the position on the x-axis (time) and y-axis.

21 Claims, 14 Drawing Sheets

Related U.S. Application Data

(60) Provisional application No. 63/151,446, filed on Feb. 19, 2021.

(51) Int. Cl.
   *G06Q 10/0633* (2023.01)
   *G06T 11/00* (2006.01)
   *G06T 11/60* (2006.01)

(56) References Cited

U.S. PATENT DOCUMENTS

| | | |
|---|---|---|
| 7,499,046 B1 | 3/2009 | Wright et al. |
| 7,609,257 B2 | 10/2009 | Wright et al. |
| 9,152,695 B2 | 10/2015 | Tibrewal et al. |
| 9,659,391 B1 | 5/2017 | Mitra et al. |
| 11,037,342 B1 | 6/2021 | Agnew et al. |
| 2006/0031187 A1 | 2/2006 | Pyrce et al. |
| 2010/0185609 A1 | 7/2010 | Wright et al. |
| 2011/0167343 A1 | 7/2011 | Wright et al. |
| 2015/0170382 A1 | 6/2015 | Bhatia |
| 2016/0225171 A1* | 8/2016 | Lentz ............... G06T 11/206 |
| 2019/0080288 A1* | 3/2019 | Daniels ............ G06Q 10/103 |

OTHER PUBLICATIONS

DataWrapper, "Customizing your symbol map", posted Dec. 5, 2020, https://academy.datawrapper.de/article/120-customizing-your-symbol-map (Year: 2020).

Jeff Lenning, Excel Formula to Allocate an Amount into Monthly Columns, Sep. 26, 2013, https://www.excel-university.com/excel-formula-to-allocate-an-amount-into-monthly-columns/ (Year: 2013).

Marco Russo, Improving timeline charts in Powel 81 with DAX, Aug. 17, 2020, https://www.sqlbi.com/articles/improving-temporal-line-charts-in-power-bi-with-dax/ (Year: 2020).

Ryan Dube, "How to Create a Timeline in Excel", Dec. 2, 2020, https://www.lifewire.com/how-to-create-a-timeline-in-excel-4691361 (Year: 2020).

United States U.S. Appl. No. 17/245,763, Advisory Action dated Oct. 18, 2023.

United States U.S. Appl. No. 17/245,763, Final office action dated Jun. 12, 2023.

United States U.S. Appl. No. 17/245,763 Non-Final office Action dated Feb. 2, 2023.

United States U.S. Appl. No. 17/245,763, Notice of Allowance dated Dec. 7, 2023.

\* cited by examiner

| Part | Site | Model | Pool | Type | Quantity | Level | ID Due Date | ID Available Date | SR Available Date | PO Due Date |
|------|------|-------|------|------|----------|-------|-------------|-------------------|-------------------|-------------|
| POJmtSG | Canton | None | BuyGreat | IndependentDemand | 15,000 | 0 | 07-06-17 | | | |
| POJmtSG | Canton | None | BuyGreat | PlannedOrder | 15,000 | 1 | | 07-11-17 | | 07-06-17 |
| CaseGrp | Canton | None | Unpooled | OnHand | 15,000 | 1 | | | | 07-11-17 |
| CaseGrp | Canton | None | Unpooled | PlannedOrder | 25,000 | 1 | | | | 07-18-17 |
| CaseGrp | Canton | None | Unpooled | PlannedOrder | 25,000 | 1 | | | | 07-25-17 |
| CaseGrp | Canton | None | Unpooled | PlannedOrder | 25,000 | 1 | | | | 08-01-17 |
| CaseGrp | Canton | None | Unpooled | PlannedOrder | 37,500 | 1 | | | | 08-08-17 |
| CaseGrp | Canton | None | Unpooled | PlannedOrder | 37,500 | 1 | | | | 08-15-17 |
| CaseGrp | Canton | None | Unpooled | PlannedOrder | 37,500 | 1 | | | | 08-22-17 |
| CaseGrp | Canton | None | Unpooled | PlannedOrder | 50,000 | 1 | | | | 08-29-17 |
| CaseGrp | Canton | None | Unpooled | ScheduledReceipt | 10,000 | 1 | | | 07-23-17 | |
| CaseGrp | Canton | None | Unpooled | ScheduledReceipt | 25,000 | 1 | | | 07-24-17 | |
| CaseGrp | Canton | None | Unpooled | PlannedOrder | 15,000 | 1 | | | | 08-27-17 |

FIG. 5

SYSTEMS AND METHODS FOR TIMELINE VISUALIZATION

CROSS-REFERENCE TO RELATED APPLICATIONS

This application is a continuation of U.S. application Ser. No. 17/245,763, filed on Apr. 30, 2021, which claims priority to U.S. patent application Ser. No. 63/151,446, filed on Feb. 19, 2021, the entire content of which is herein incorporated by reference.

BACKGROUND

In many diverse fields, where data is often massive, with hierarchies and inter-relations, it is often difficult to ascertain relationships between various entities by examining tabular representation of the data. For example, supply chain data is complex and large, comprising a large number of entities. Often, there are complex relationships between these entities, as well as hierarchies among the entities. Such data is currently represented in tabular form, consisting of rows and columns, making it difficult to ascertain these relationships and hierarchies. It is difficult to discover temporal patterns and relationships in data using solely tabular form.

BRIEF SUMMARY

Systems and methods of timeline visualization disclosed herein, make it easier to analyze complex chronologies of events related to multiple entities, as well as the relationships between these events. Such a timeline visualization allows for visualization of time lapses between events, durations, and simultaneity of events.

Systems and methods of timeline visualization disclosed herein, define a table structure which represents interrelated data in a generic way. For example, the table structure can represent supply chain management actions. The content of the table is then processed by the timeline visualization to extract the entities, events, their relationships, and their attributes. These entities are transformed onto time axes, while events are transformed into a visual representation of their attributes using a combination of color, shapes, text labels and tooltips. The events may be positioned on a canvas, above or below a timeline axis, depending on whether they are upstream or downstream events, using a layout module which determines the position on the x-axis (time) and the y-axis.

The output of the timeline visualization helps a user analyze and understand decisions made by users and algorithms of a complex system. For example, the complex system can be a supply chain management system. The spatial representation of supply planning events and visual representation of the metrics can reveal the data at multiple levels of detail, thereby helping a user understand causality; this allows the user to take appropriate decisions going forward. The customizability of the data mapping allows a user to choose the relevant metrics for a given use-case, and to compare them.

In one aspect, a computer-implemented method for timeline visualization, the method includes applying, by a processor, a set of mappings and one or more settings to a worksheet data, thereby producing a mapped worksheet data, creating, by the processor, a data model based on the mapped worksheet data, the data model includes timeline data and legend data, computing, by the processor, based on the timeline data, one or more timeline axes and a position for one or more events associated with each timeline axis, and displaying, by the processor, the one or more events in chronological order along each of the one more time axes.

The computer-implemented method may also further include listening, by the processor, for a one or more user input events.

In some embodiments of the computer-implemented method, the set of mappings comprise a data mapping and a style mapping, in which the data mapping is applied to one or more columns of the worksheet data and the data mapping includes one or more categories of mappings. The style mapping can customize a symbol and a colour for each series of events.

In some embodiments of the computer-implemented method, the one or more categories of mappings includes a timeline mapping, an instant event mapping, and an interval event mapping; the instant event mapping and the interval event mapping each comprising a date mapping, a label mapping and a tooltip mapping; the date mapping of the instant event mapping accepting one or more date columns of the worksheet data, each date column representing a single series of a type of instant event; the date mapping of the interval event mapping accepting a pair of date columns of the worksheet data, each pair of date columns representing a single series of a type of interval event; the label mapping accepting one or more attribute columns of the worksheet data, a content of each of the one or more attribute columns displayed on a label associated with an event; and the tooltip mapping accepting one or more item identifiers.

In another aspect, a system includes a processor. The system also includes a memory storing instructions that, when executed by the processor, configure the system to apply, by the processor, mappings and settings to a worksheet data, thereby producing a mapped worksheet data, create, by the processor, a data model based on the mapped worksheet data, the data model includes timeline data and legend data, compute, by the processor, based on the timeline data, one or more timeline axes and a position for one or more events associated with each timeline axis, and display, by the processor, the one or more events in chronological order along each of the one or more time axes.

The system may also include where the instructions further configure the system to listen, by the processor, for a one or more user input events.

In some embodiments of the system, the mappings comprise a data mapping and a style mapping, in which the data mapping is applied to one or more columns of the worksheet data and the data mapping includes one or more categories of mappings. The style mapping can customize a symbol and a colour for each series of events.

In some embodiments of the system, the one or more categories of mappings includes a timeline mapping, an instant event mapping, and an interval event mapping; the instant event mapping and the interval event mapping each comprising a date mapping, a label mapping and a tooltip mapping; the date mapping of the instant event mapping accepting one or more date columns of the worksheet data, each date column representing a single series of a type of instant event; the date mapping of the interval event mapping accepting a pair of date columns of the worksheet data, each pair of date columns representing a single series of a type of interval event; the label mapping accepting one or more attribute columns of the worksheet data, a content of each of the one or more attribute columns displayed on a label associated with an event; and the tooltip mapping accepting one or more item identifiers.

In yet another aspect, a non-transitory computer-readable storage medium, the computer-readable storage medium including instructions that when executed by a computer, cause the computer to apply, by a processor, mappings and settings to a worksheet data, thereby producing a mapped worksheet data, create, by the processor, a data model based on the mapped worksheet data, the data model includes timeline data and legend data, compute, by the processor, based on the timeline data, one or more timeline axes and a position for one or more events associated with each timeline axis, and display, by the processor, the one or more events in chronological order along each of the one or more time axes.

The computer-readable storage medium may also include instructions that further configure the computer to listen, by the processor, for a one or more user input events.

In some embodiments of the computer-readable storage medium, the mappings comprise a data mapping and a style mapping, in which the data mapping is applied to one or more columns of the worksheet data and the data mapping includes one or more categories of mappings. The style mapping can customize a symbol and a colour for each series of events.

In some embodiments of the computer-implemented method, the one or more categories of mappings includes a timeline mapping, an instant event mapping, and an interval event mapping; the instant event mapping and the interval event mapping each includes a date mapping, a label mapping and a tooltip mapping, the date mapping of the instant event mapping accepting one or more date columns of the worksheet data, each date column representing a single series of a type of instant event, the date mapping of the interval event mapping accepting a pair of date columns of the worksheet data, each pair of date columns representing a single series of a type of interval event, the label mapping accepting one or more attribute columns of the worksheet data, a content of each of the one or more attribute columns displayed on a label associated with an event, and the tooltip mapping accepting one or more item identifiers.

Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

The foregoing and other advantages of the disclosure will become apparent upon reading the following detailed description and upon reference to the drawings.

To easily identify the discussion of any particular element or act, the most significant digit or digits in a reference number refer to the figure number in which that element is first introduced.

FIG. 5 illustrates an example of a data worksheet in accordance with one embodiment.

Figure 1:
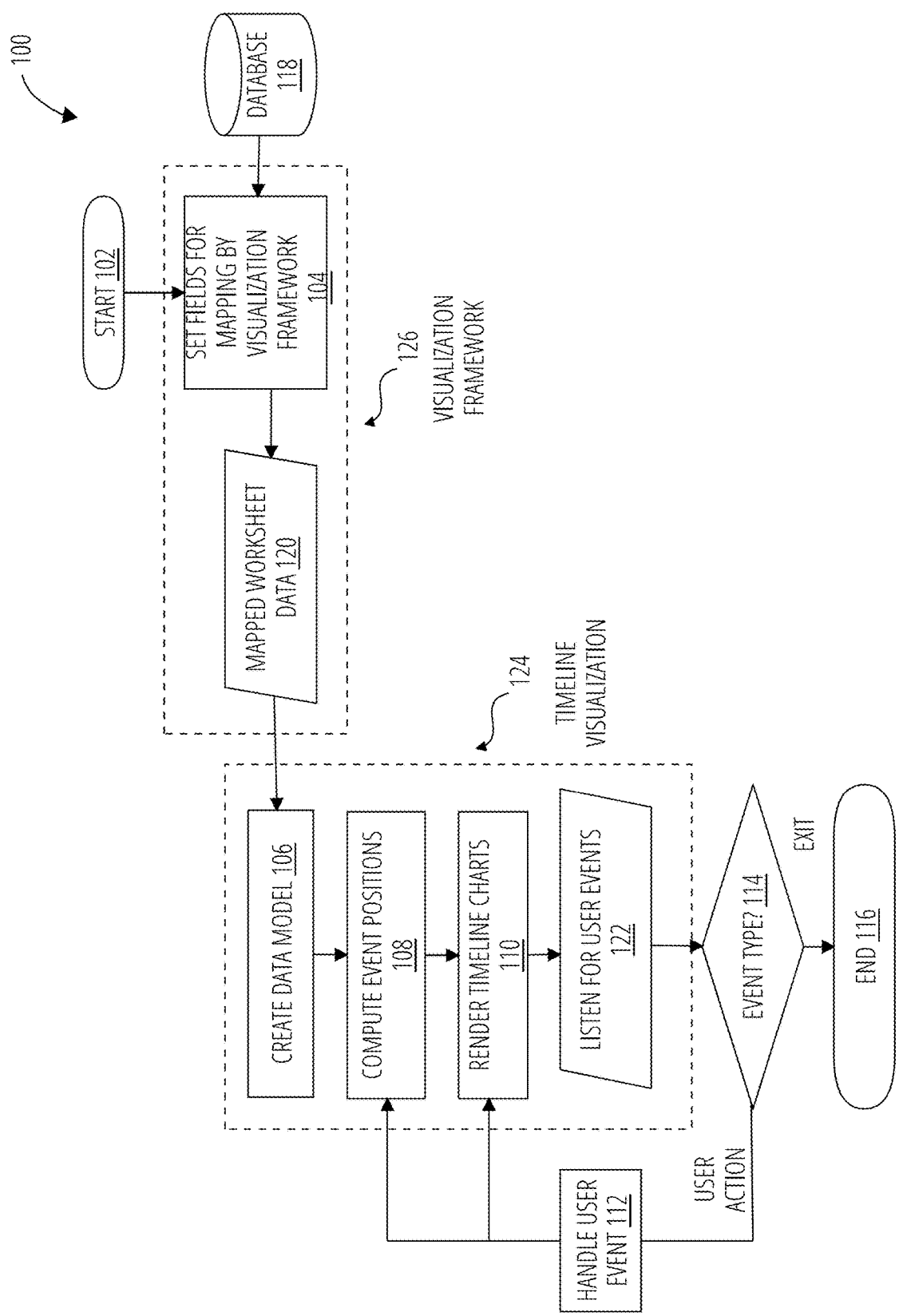
FIG. 1 illustrates a flow chart in accordance with one embodiment.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

A system for timeline visualization can rely on the following: a server containing data that is to be visualized; a visualization framework that allows a dynamic visualization to access data from a table and to customize data mappings; a visualization library supporting scatter and range series charts; and an HTML Web browser to render the visualization.

In some embodiments, the system comprises: a first module that maps data with a single date time as an instant event; a second module that maps data with start and end dates as an interval event; a table structure that represents instant events; a table structure that represents interval events; a dynamic visualization that takes the event tables as input and parses each table to create a map of events on one or more timelines; a third module that generates legend data for the event tables; a fourth module that processes quantitative data mappings; and a fifth module that generates visual representations of data mappings as symbols overlaid on a plurality of timeline axes. A user can author a worksheet to conform to the format (i.e. table structure) described above. The table of instant events can include supply chain management events such as independent demands, planned orders, scheduled receipts, on-hand inventory changes, and forecast demands. The table of interval events can include supply chain managements interval events such as: constraints, lead time, expiry, due date, need date, and availability.

FIG. 1 illustrates a flow chart in accordance with one embodiment.

Mapped worksheet data 120 is generated from a database 118, such that the worksheet conforms to the format described above. In order to arrive at mapped worksheet data 120 from data retrieved from database 118, an author, at step 104, sets a number of fields for mapping raw worksheet data (see, FIG. 5 for an example of a raw worksheet data), by visualization framework 126, to mapped worksheet data 120. That is, visualization framework 126 allows a user to customize data mappings (for example, choose which data columns should be represented in the visualization) at step 104. The visualization framework 126 uses these mappings to produce a mapped worksheet data 120 that can be accessed by timeline visualization 124 to render a visualization of the data at step 110. Prior to step 110, timeline visualization 124 creates a data model at step 106. The timeline visualization 124 transforms the mapped worksheet data 120 into a data model containing data for one or multiple timelines, each of which comprises one or more event data series (instant and/or interval). A layout module is used to compute event positions at step 108; event positions are appended to the data model.

The data model comprises a timeline data model and a legend data model. The timeline data model (which is a subset of the data model generated at step 106) is an object that associates each timeline label to the list of instant events and interval event series that are associated with that label. Each event series has a name, a shape, a color, and a list of events. Each event has one date (for an instant event) or two dates (for an interval event), as well as a label, drilling information and tooltip fields. The timeline data is consumed by a visualization library to create a dynamic timeline chart using Web technologies (such as HTML and JavaScript), which is rendered on a screen by a Web browser at step 110.

The legend data model (which is a subset of the data model generated at step 106) is an object that associates each event series name (or type) to its visual encodings (shape, color). The legend data is consumed by a legend manager to render a plurality of legend items describing the meaning of shape and colour encodings. That is, the legend manager takes legend data as input and generates a widget that contains the legend of the chart. The legend manager is further described in FIG. 10.

Once the timeline charts are rendered (at step 110), a user can further explore the charts at step 122, where the system listens for user events (described below). Further actions depend on the type of user event (decision block 114): either further user action, or user exit. If the user decides to exit, then program ends at step 116.

Where there is a user action, the user event is handled at step 112, which either returns to step 108 (compute event positions), or step 110 (render timeline charts), depending on the nature of the user event handled at step 112. For example, user events such zoom and pan actions, modify the timeline axis. As such, when these actions are performed, the layout (step 108) of the timeline needs to be recalculated. On the other hand, there are other user events that do not modify the timeline axis; the timeline is refreshed, but the positions of events are not recalculated. In such cases, the flowchart reverts to step 110. Examples of user events that revert back to step 110 include: vertical scroll (in which the scroll view is updated); hover (in which a tooltip is shown; and left click (in which a drill action is performed).

Figure 2:
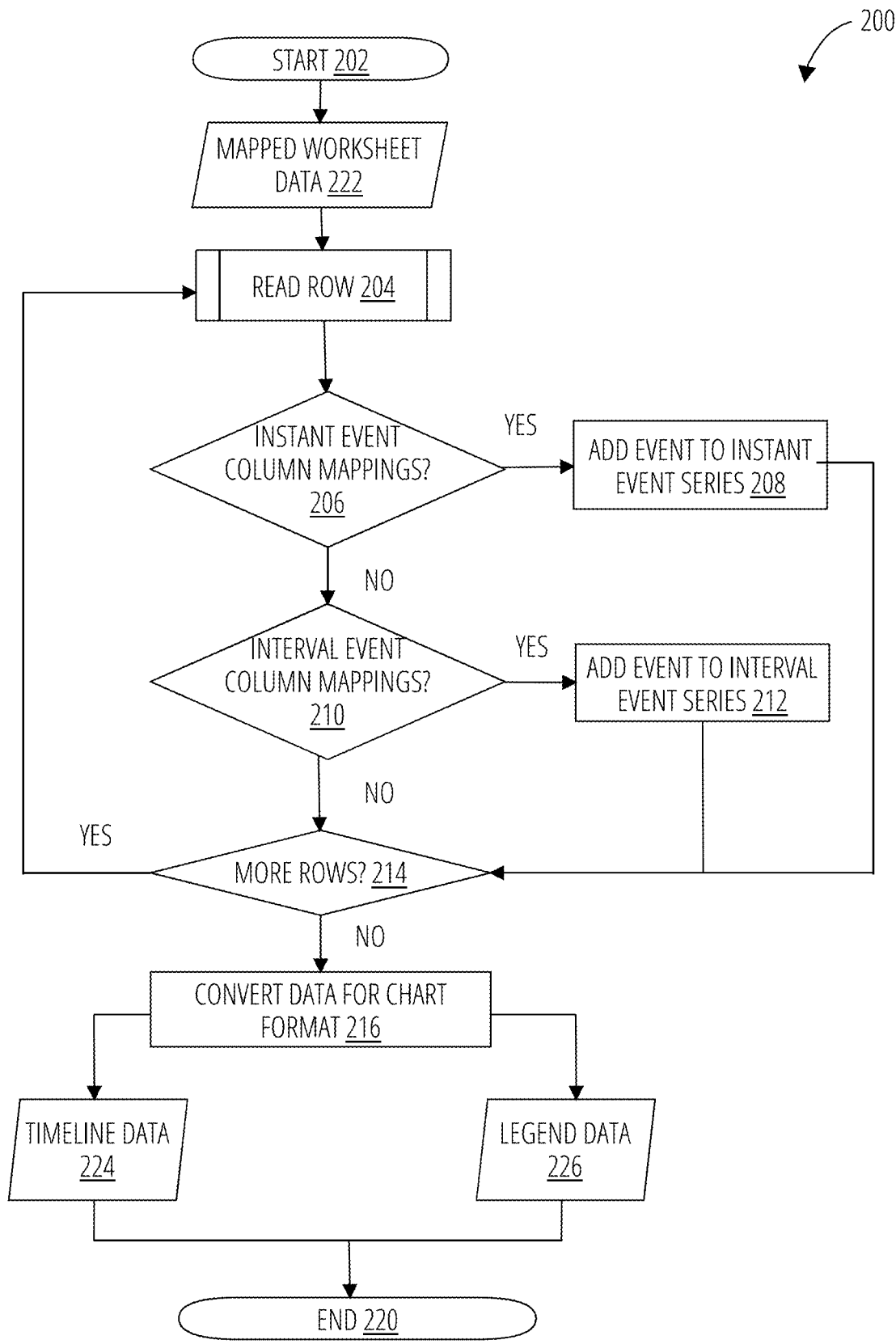
FIG. 2 illustrates a flow chart for a subroutine to create a data model in accordance with one embodiment.

FIG. 2 illustrates a flowchart 200 for a subroutine to create a data model in accordance with one embodiment. Creation of a data model (see step 106 of FIG. 1) is described in further detail with reference to FIG. 2.

A first row of the mapped worksheet data 222 is read at step 204. The mapped worksheet data 222 has been formatted into a table structure that includes single events and interval events, as described above. If the row includes instant event column mappings (decision block 206), the event is added to a series of instant events at step 208. On the other hand, if the row includes interval event column mappings (decision block 210), then the event is added to a series of interval events (block 212). If there are more rows, then the system reverts to step 204; otherwise, after reading all of the rows, the data is converted for chart format, whereby timeline data 224 and legend data 226 are produced.

The timeline data 224 is an object that associates each timeline label to the list of instant events and interval event series that are tied to the given label. Each event series has a name, a shape, a color, and a list of events. Each event has either one date (if it is an instant event) or two dates (if it is an interval event), as well as a label, drilling information and tooltip fields.

The legend data is an object that associates each event series name (or type) to its visual encodings (shape, color).

Figure 3:
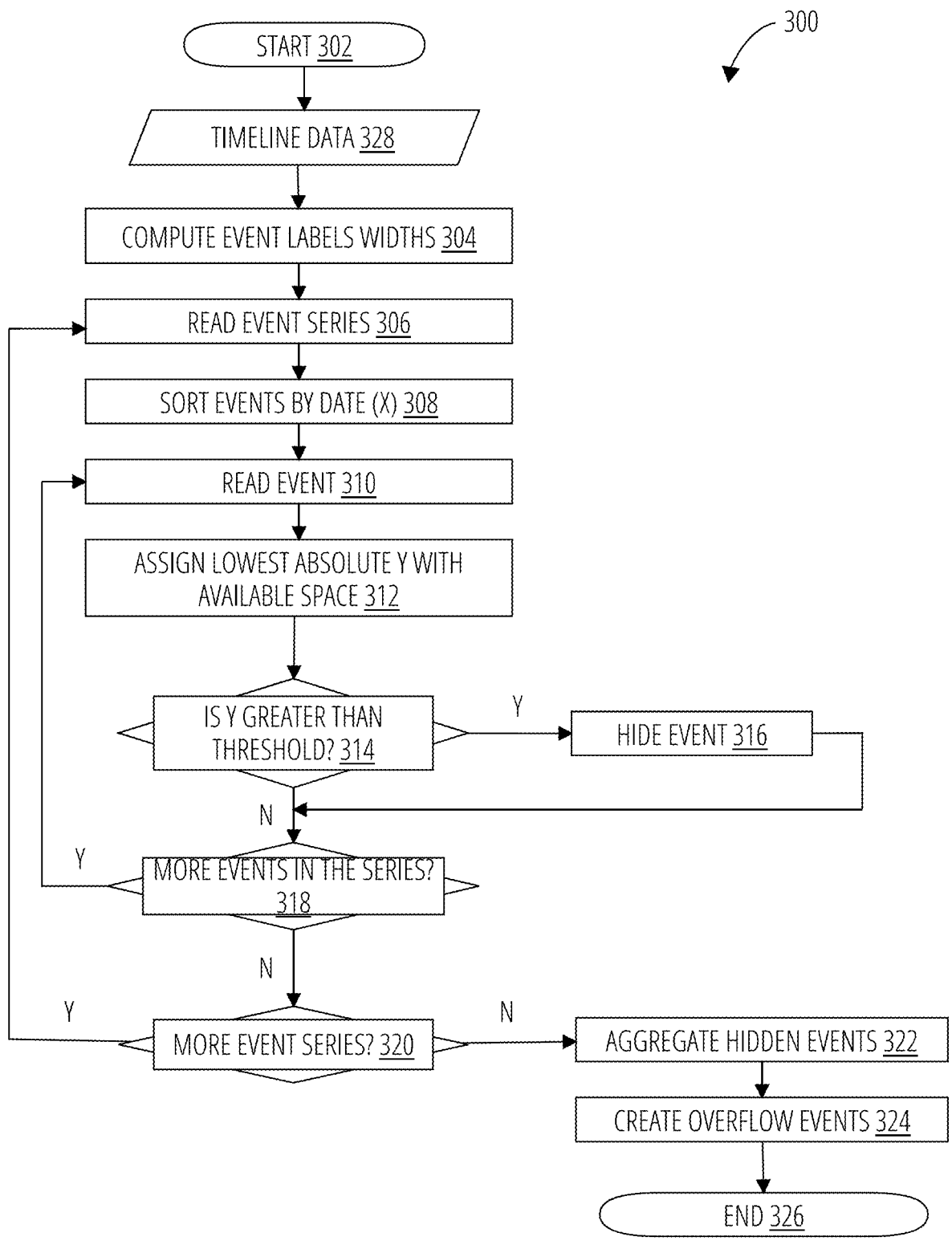
FIG. 3 illustrates a flowchart for a subroutine to compute event positions in accordance with one embodiment.

FIG. 3 illustrates a flowchart 300 for a subroutine (i.e. a timeline layout module) to compute event positions (step 110 in FIG. 1) in accordance with one embodiment. Computation of event positions is described in further detail with reference to FIG. 3.

The timeline layout module is responsible for positioning events on a timeline while preventing the events from overlapping. The module positions top-down events above an X-axis (positive Y), and bottom-up events below the X-axis (negative Y).

Beginning with the timeline data 328 (obtained after creation of the data model), the timeline layout module first measures the width of event labels at step 304. This corresponds to the width needed to render an event. The timeline layout module then reads an event series at step 306, and sorts events (within the series) by date (i.e. position on the X-axis) at step 308. The X position of a given event is determined by the date of the event.

In order to determine the Y-position of a given event, the timeline layout module reads the event at step 310. That is, the data model contains multiple series of data. Each series contains a list of events of a specific type. Reading the events is the process of iterating through the series and processing each event accordingly.

At step 312, the module assigns the lowest absolute Y with available space. That is, each instant event has one date. The algorithm processes one event at a time. The timeline chart uses logic to determine the Y coordinate for the event it is processing. This computation of the Y value is done only for the event being processed. The other events are not affected in step 312.

The Y position corresponds to the next available Y (by increment of one level) that is closest to the axis (lowest absolute Y: positive Y for top-down, negative Y for bottom-up events). This refers to the coordinate system of the timeline chart, that is, the indexing of Y co-ordinates to place the events. The time axis is located at Y=0. The first top-down event is placed at Y=1. The first bottom up event will be placed at Y=−1. The next top-down event processed will be placed at Y=1 if it fits there without overlapping with previously positioned events. If the date of the next event causes overlap, the event will be placed at Y=2, and so on. Similarly, the next bottom-up event processed will be placed at Y=−1 if it fits there without overlapping with previously positioned events. If the date of the next event causes overlap, the event will be placed at Y=−2, and so on.

If the next available Y position exceeds a user-defined threshold (at decision block 314), the event is hidden at step 316 and will be aggregated into an overflow event at step 322 and step 324.

The timeline layout module then checks to see if there is another event in the series at decision block 318. If yes, the next event is read at step 310, and the procedure follows steps 312-314 until all of the events within a series are processed.

The timeline layout module then checks to see if there is another series that needs to be processed at decision block 320. If yes, then the module returns to step 306, and processes the next series, repeating the necessary steps until all of the event series have been processed.

The hidden events (compiled at step 316) are aggregated at step 322, followed by creation of overflow events at step 324, after which the timeline layout module ends at 326. Overflow events are events that aggregate two or more events that are hidden from view in the final visualization. Overflow events allow for compression of timelines vertically, freeing space for displaying more timelines on the canvas. Overflow events are automatically created whenever the number of events stacked on either side of the timeline axis exceeds the user-defined Y-threshold. This usually happens when many events happen on the same date, or when timeline widget dimensions are small.

For example, with a user-defined threshold set to 3, the timeline displays up to 3 levels of events on each side of the X-axis. Events that do not fit within these levels are aggregated under overflow events. Overflow events can be labelled with the number of events within the aggregate (for example: "14 more"). When the aggregated events have numeric labels, then overflow events are labelled with the numeric sum of the aggregated events (for example: "157, 900"). For example, an overflow can collapse 14 events into a single event on the timeline chart; the quantity displayed will be the aggregate (sum) of the constituent events.

When hovering over an interval event, a tooltip displays the list of events that are hidden, along with their attributes: type (symbol, color), date(s), and label(s), as discussed further below.

Figure 4:
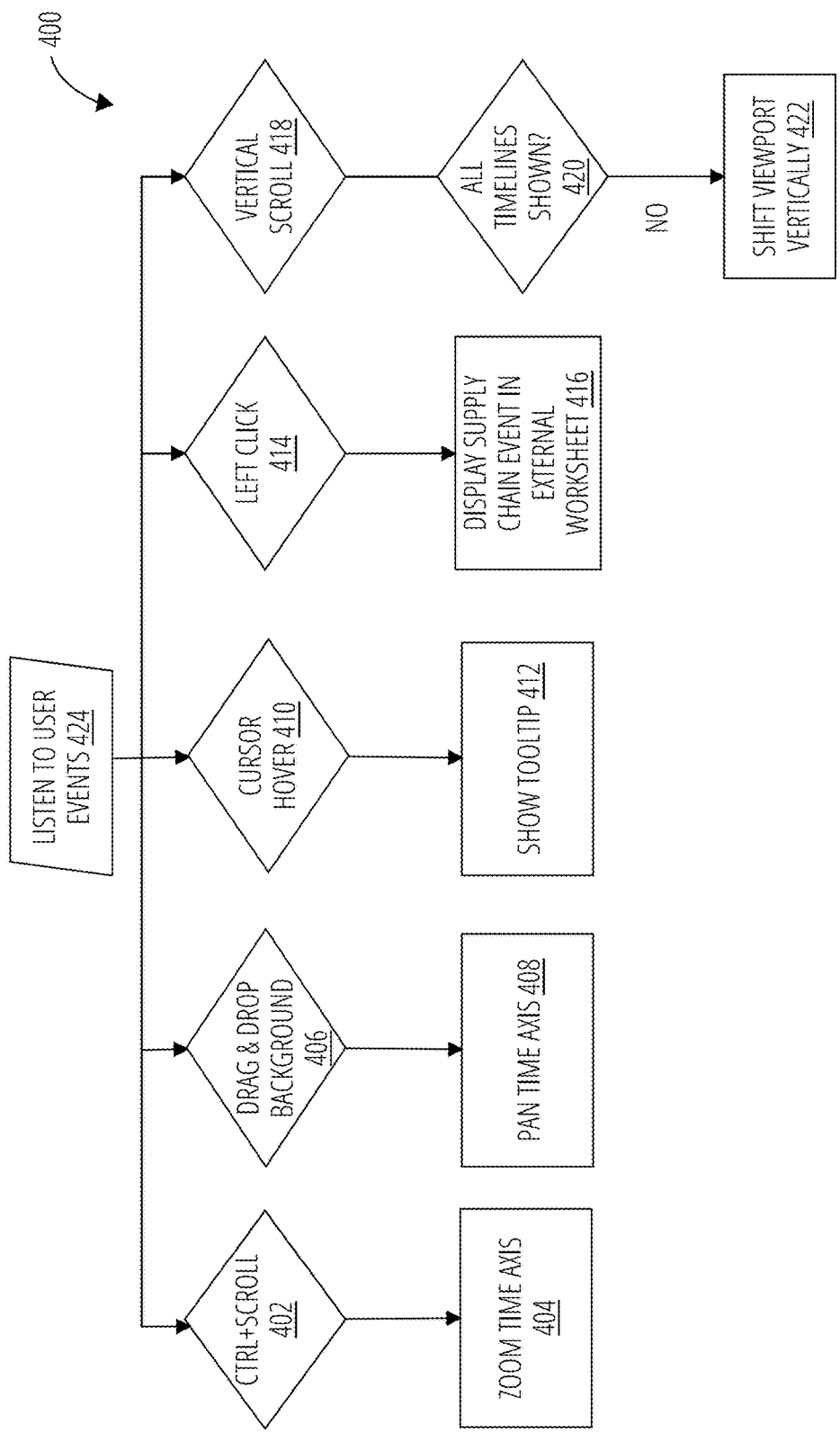
FIG. 4 illustrates a flow chart for a subroutine to listen for user events in accordance with one embodiment.

FIG. 4 illustrates a flow chart 400 for a subroutine to listen for user events (step 122 in FIG. 1) in accordance with one embodiment. Listening for user events 424 is described in further detail with reference to FIG. 4.

Different actions by a user of a mouse provide for different actions to further examine the visualization. For example, clicking CTRL+scroll 402 leads to a zoom of the time axis (404); Drag & drop background 406 leads to panning the time axis (408); cursor hover 410 leads to showing of a tooltip (412); left click 414 leads to a display of supply chain event(s) in an external worksheet (416); and vertical scroll 418 leads to a display of timelines above/below the current viewport 420. If all timelines are not shown, then viewport shifts vertically at 422.

Figure 6A:
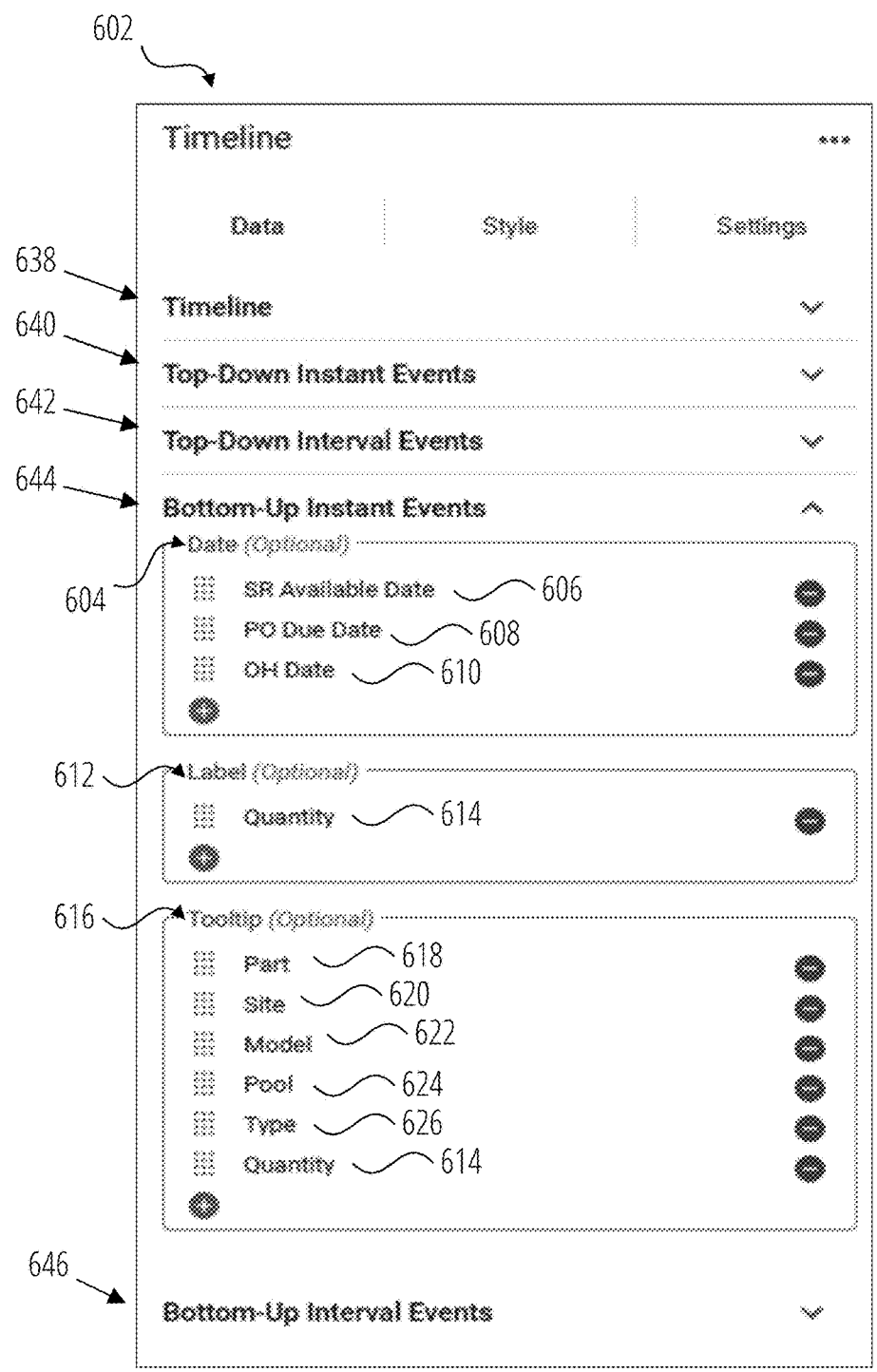
FIG. 6A illustrates an example of column mappings applied to the data worksheet in FIG. 5.
Figure 6B:
FIG. 6B illustrates an example of a style configuration applied to the data columns of the data worksheet in FIG. 5.
Figure 6C:
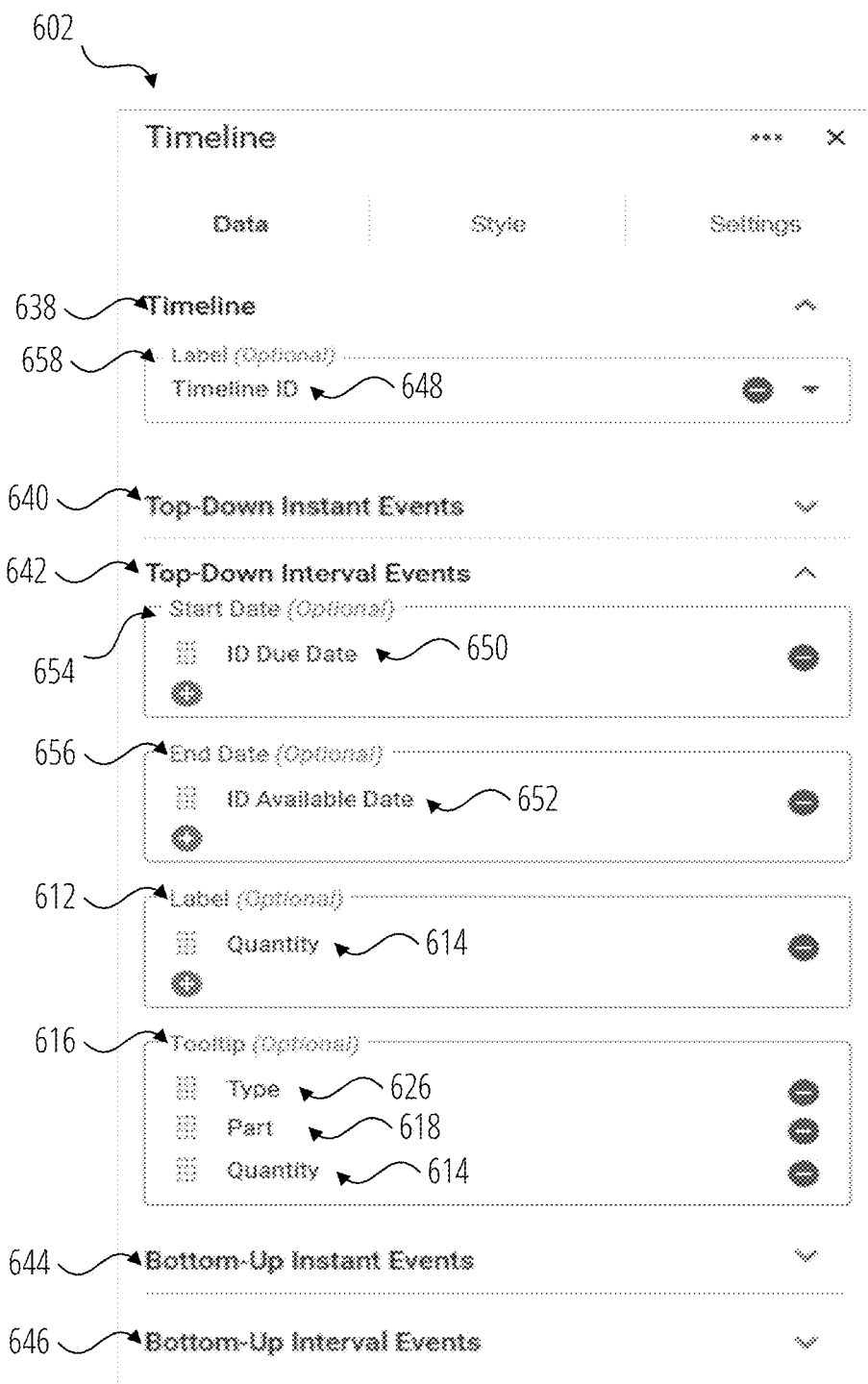
FIG. 6C illustrates an example of column mappings applied to the data worksheet in FIG. 5.
Figure 6D:
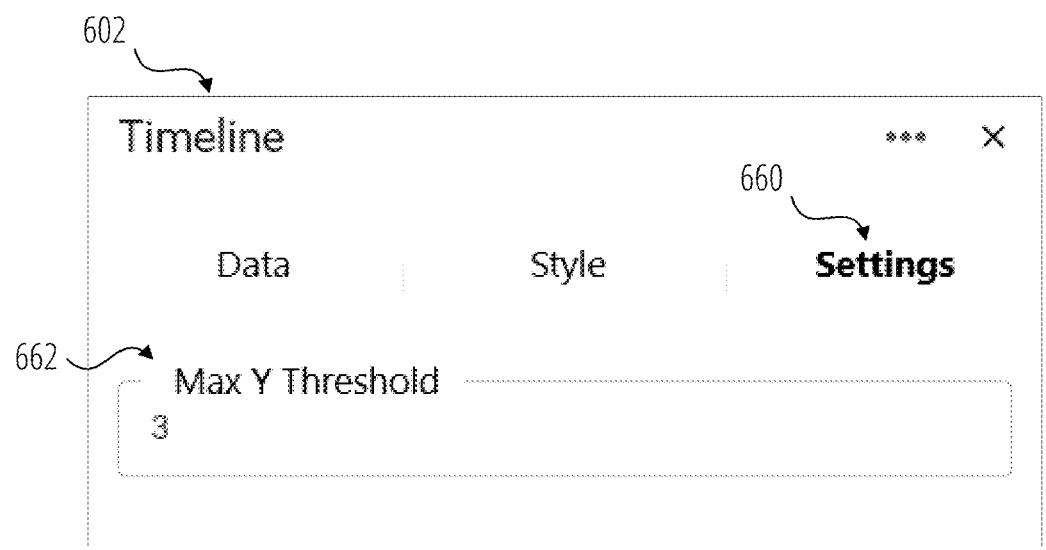
FIG. 6D illustrates an example of a setting applied to the data columns of the data worksheet in FIG. 5
Figure 7:
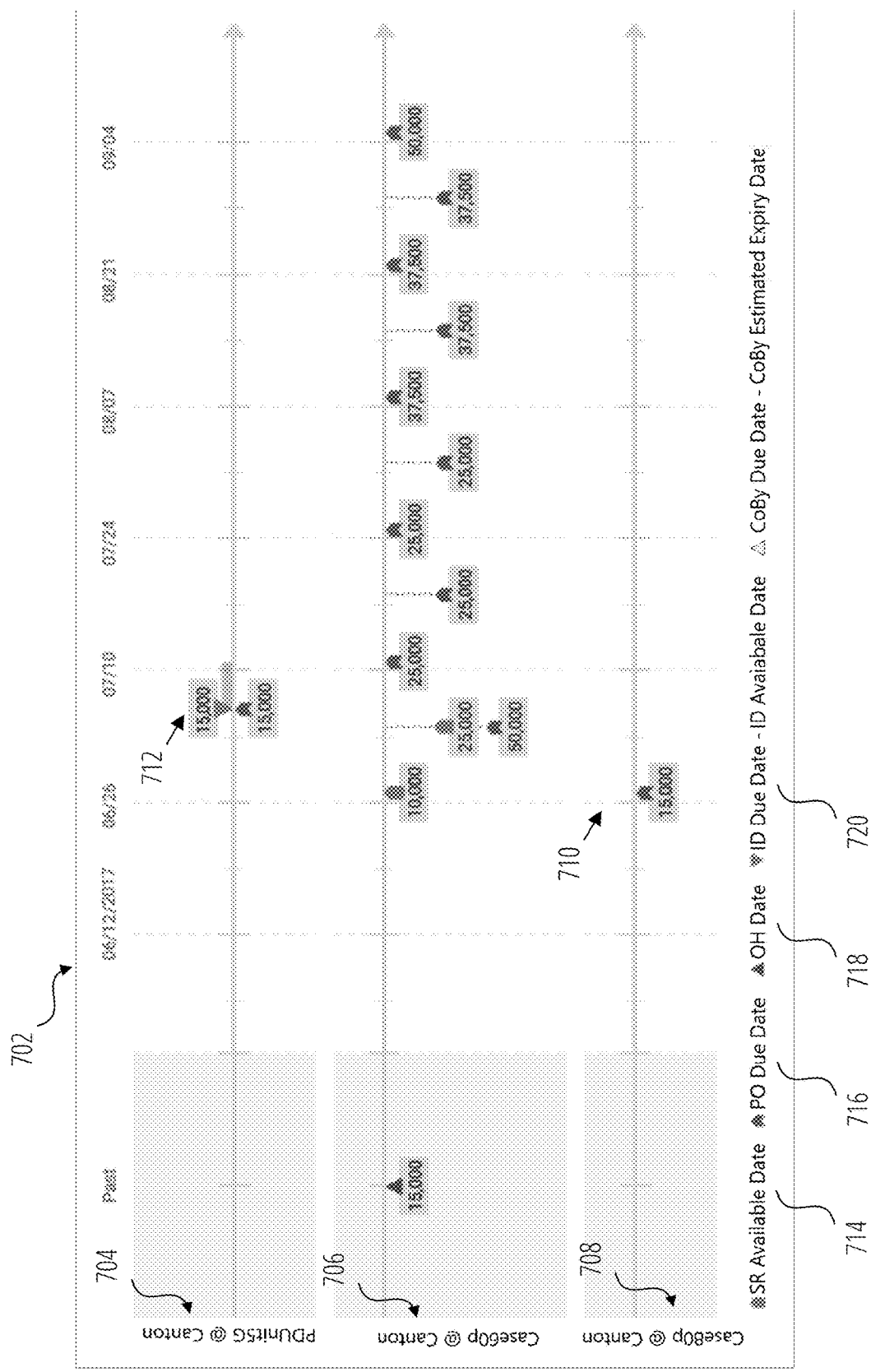
FIG. 7 illustrates a timeline visualization of the data worksheet shown in FIG. 5, based on the column mappings of FIG. 6A.

FIG. 5-FIG. 7 illustrate an example of converting raw worksheet data to a timeline visualization. FIG. 5 illustrates an example of raw worksheet data 502 (obtained from database 118 in FIG. 1) in accordance with one embodiment. This worksheet data 502 is an example of data that the timeline visualization can be based on. Note that raw worksheet data 502 is converted to a mapped worksheet data 120 by the visualization framework 126; the mapped worksheet data is then used by a timeline visualization to render one or more timelines.

In FIG. 5, each distinct value in the timeline column 504 will generate a distinct timeline. In FIG. 5, there are three distinct values in the timeline column 504: "PDUnit5G @ Canton", "Case60p @ Canton", and "Case80p @ Canton". Therefore, the timeline visualization will show three timelines—one for each timeline value.

Each timeline will have associated with it, one or more events. An event refers to the entries in a given row for a given timeline value. That is, an event is defined by either one date (an instant event) or two dates (an interval event), along with other attributes. In FIG. 5, for example, row 50 indicates an event for the timeline value "PDUnit5G @ Canton"; the event is an interval event (namely, based on its Independent Demand Due Date 514 and its Independent Demand Available Date 516) between 07-06-17 and 07-11-17, having the following attributes: Part=PDUnit5G, Site=Canton, Model=blank, Pool="BuyGreat", Type="IndependentDemand", Quantity=15,000, and Level='0'. In another example of an event, row 58 indicates an event for the timeline value "Canton60p @ Canton"; the event is an instant event (namely, based on its Planned Order Due Date 520) on 8-15-17, having the following attributes: Part=PDUnit5G, Site=Canton, Model="None", Pool="Unpooled", Type="PlannedOrder", Quantity=37, 500, and Level='1'. Therefore, each row indicates an event for the timeline value of that row; in the final timeline visualization, each event will be rendered onto a timeline specific to the event.

The Part 506, Site 508, Model 510, Pool 512, and Type 626 columns are exclusively used in the tooltip, and further elaborated in FIG. 6A. Columns Independent Demand Due Date 514 and Independent Demand Available Date 516 define the start and end date of a single series of top-down interval events. Columns Scheduled Receipt available date 518, Planned Order Due Date 520 and On Hand Date (not shown) define three series of Bottom-Up Instant Events (as shown in FIG. 7). The Quantity 522 column is used as a label for all types of events.

FIG. 6A illustrates an example of mappings 602 applied to the raw worksheet data 502 in FIG. 5. Mappings can accept a single column or multiple columns from the raw worksheet data 502.

In mappings 602, there are five categories of mappings: timeline mapping 638, top-down instant events 640, top-down interval events 642, bottom-up instant events 644 and bottom-up interval events 646. In FIG. 6A, details for mapping bottom-up instant events 644 are provided, and discussed below.

Date mapping 604 accepts columns containing dates, with each column representing a single series of a specific type of event (for example, Scheduled Receipt available date 606, Planned Order due date 608, On Hand date 610).

The Label mapping 612 takes one or two columns, the content of which is displayed on a label below/above the event. In mappings 602, only one column, namely quantity 522 (in FIG. 5) is used in the label mapping 612, so that each event is labeled by its quantity. However, as an example, it is possible to label an event by concatenation of two columns—for example, an event can be labeled by its quantity and its priority (for example, high, medium, low). The event label (for example, "15,000 H") is formed from the concatenation of both a quantity and priority column.

The Tooltip mapping 616 accepts a variety of item identifiers, such as Part 618, Site 620, Model 622, Pool 624, Type 626, and Quantity label 614. That is, each tooltip column in FIG. 5 (part 506, site 508, model 510, pool 512, type 524 and quantity 522) is represented by a line in the Tooltip mapping 616.

FIG. 6B illustrates an example of style mappings applied to the raw worksheet data 502 in FIG. 5. The visualization author can customize the shape and color for each series of events (i.e. each data column). In particular, FIG. 6B illustrates the mappings 602 that the timeline visualization takes as input. Each data column has a symbol 628 and a colour 630 associated with symbol 628.

In the style mapping, the Scheduled Receipt available date 606 is displayed by an arrow symbol; the colour of the arrow is shown by item 632 (since FIG. 6B is shown in grey scale, item 632 is in reality, turquoise blue). Similarly, the Planned Order due dates 608 is displayed by a chevron symbol; the colour of the chevron is shown by item 634 (since FIG. 6B is shown in grey scale, item 634 is in reality, purple). Finally, the On Hand date 610 is displayed by a triangle symbol; the colour of the triangle is shown by item 636 (since FIG. 6B is shown in grey scale, item 938 is in reality, black).

FIG. 6C further illustrates an example of mappings 602 shown in FIG. 6A. As in FIG. 6A, there are five categories of mappings: timeline mapping 638, top-down instant events 640, top-down interval events 642, bottom-up instant events 644 and bottom-up interval events 646. In FIG. 6C, details for mapping for each of timeline mapping 638 and top-down interval events 642 are provided, and discussed below.

For timeline mapping 638, label mapping 658 accepts a column (for example, timeline column 504 in FIG. 5) containing timeline ID 648. That is, each timeline has a label identified by timeline ID 648.

For top-down interval events 642, start date mapping 654 accepts columns containing a start date (for example, ID due date 650) and a corresponding end date (for example, ID available date 652).

As in FIG. 6A, the Label mapping 612 takes one or two columns, the content of which is displayed on a label below/above the event. In mappings 602, only one column, namely quantity 522 (in FIG. 5) is used in the label mapping 612, so that each event is labeled by its quantity. However, as an example, it is possible to label an event by concatenation of two columns—for example, an event can be labeled by its quantity and its priority (for example, high, medium, low). The event label (for example, "15,000 H") is formed from the concatenation of both a quantity and priority column.

As in FIG. 6A, the Tooltip mapping 616 accepts a variety of item identifiers. In FIG. 6C, for the mapping of top-down interval events 642, this includes Type 626, Part 618 and Quantity label 614. That is, certain tooltip columns in FIG. 5 (part 506, type 524 and quantity 522) are represented by a line in the Tooltip mapping 616.

FIG. 6D illustrates an example of settings set by an author, as applied to the raw worksheet data 502 in FIG. 5. The visualization author can customize the maximum Y-threshold for any timeline according to item 662. In FIG. 6D, the author has chosen '3' as the maximum Y-threshold value.

FIG. 7 illustrates a timeline visualization 702 of the worksheet data 502 shown in FIG. 5, based on the mappings 602 of FIG. 6A-FIG. 6D.

Timeline visualization 702 contains as many timelines as unique identifiers in the timeline column 504 in FIG. 5. In FIG. 5, there are three timelines according to timeline column 504: PDUnit5G (rows 50-51) @ Canton; Case60p @ Canton (rows 52-64); and Case80p @ Canton (row 65). These correspond respectively to timeline 704, timeline 706 and timeline 708 in FIG. 7. Referring to FIG. 6C, the label mapping 658 for each timeline is the timeline ID 648 (i.e. ID in timeline column 504 of FIG. 5).

Furthermore, timeline visualization 702 contains as many events as rows in the worksheet. An example of an event is event 710, which is associated with a timeline (timeline 708), a date (June 27), and a label (15,000). In timeline visualization 702, events are labelled with their quantity attribute (quantity 522) in FIG. 5—as established by label mapping 612 in FIG. 6A. Event 710 corresponds to row 65 in FIG. 5, with its timeline, date and quantity displayed in timeline visualization 702.

Furthermore, timeline visualization 702 contains as many event series as columns mapped to "Date" mappings; according to date mapping 604 in FIG. 6A, there are three instant event series: Scheduled Receipt available date 606; Planned Order due date 608 and On Hand date 610. The first two are shown as columns Scheduled Receipt available date 518 and Planned Order Due Date 520 in FIG. 5.

In FIG. 7, there is one interval event 712, identified by its timeline (timeline 704), label (15,000), and interval dates (from July 6 to July 11). This is the visual representation of row 50 in FIG. 5.

Events types are encoded using color and symbol (as shown by mappings 602 in FIG. 6B). These are shown at the bottom of FIG. 7, as follows. The Scheduled Receipt available date 606 is denoted by a downward arrow having a turquoise colour (632), according to the mappings 602—this is shown by item 714. The Planned Order due date 608 is denoted by a chevron having a purple colour (634), according to the mappings 602—this is shown by item 716. The On Hand date 610 is denoted by a triangle having a black colour (634), according to the mappings 602—this is shown by item 718. The legend for the interval event 712 is shown by item 720.

Figure 8A:
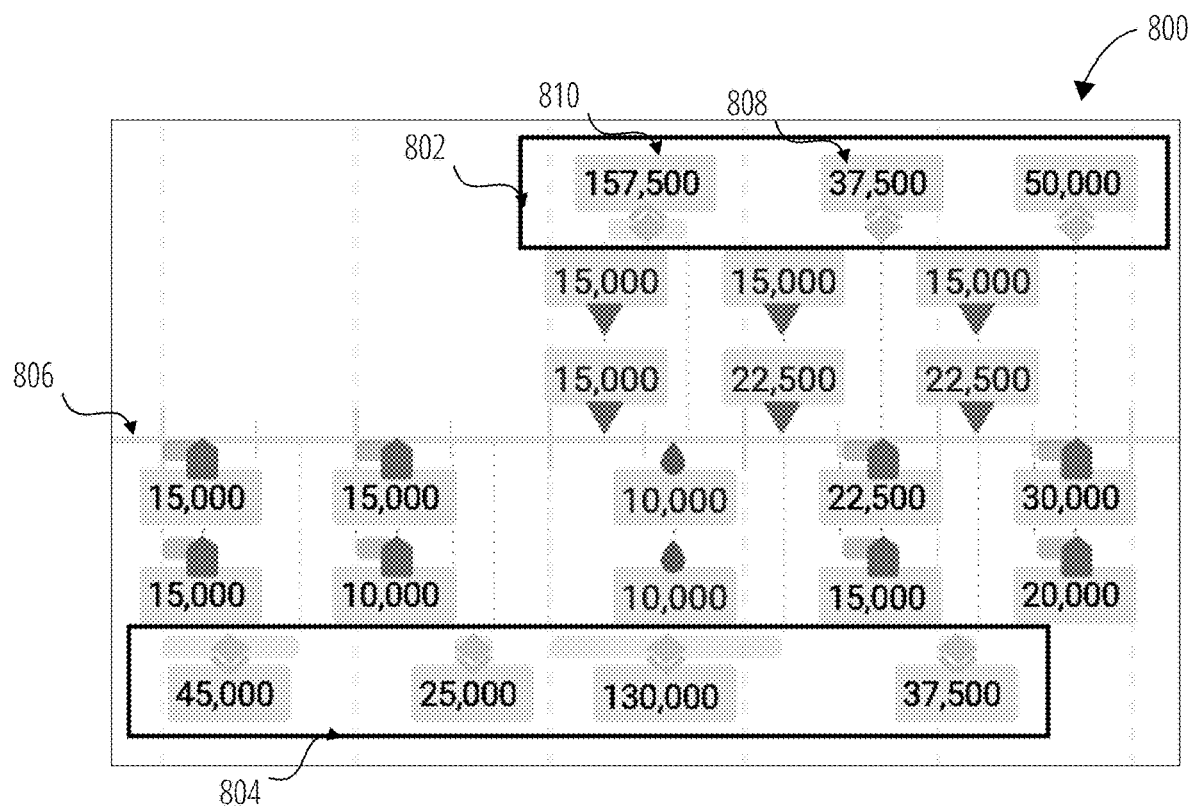
FIG. 8A illustrates overflow events in accordance with one embodiment.

FIG. 8A illustrates an example 800 of top-down overflow events 802 and bottom-up overflow events 804. In example 800, the user-defined threshold is set to 3, which means that a maximum of 3 rows of events (including overflow) are displayed on either side of the timeline axis 806. Overflow events can either be: instant events, when the events that are aggregated happen on the same day; or interval events, when they aggregate interval events or instant events happening on different days.

In FIG. 8A, each overflow event is labelled with a quantity, which corresponds to the sum of the constituent events. As an example, item 808 indicates a top-down overflow instant event having an aggregate of 37,400 units, which is the sum of the constituent events for this overflow event on a particular day in the timeline. In another example, item 810 indicates a top-down interval event having an aggregate of 157, 900 units, which is the sum of constituent events for this overflow event occurring over the interval.

Figure 8B:
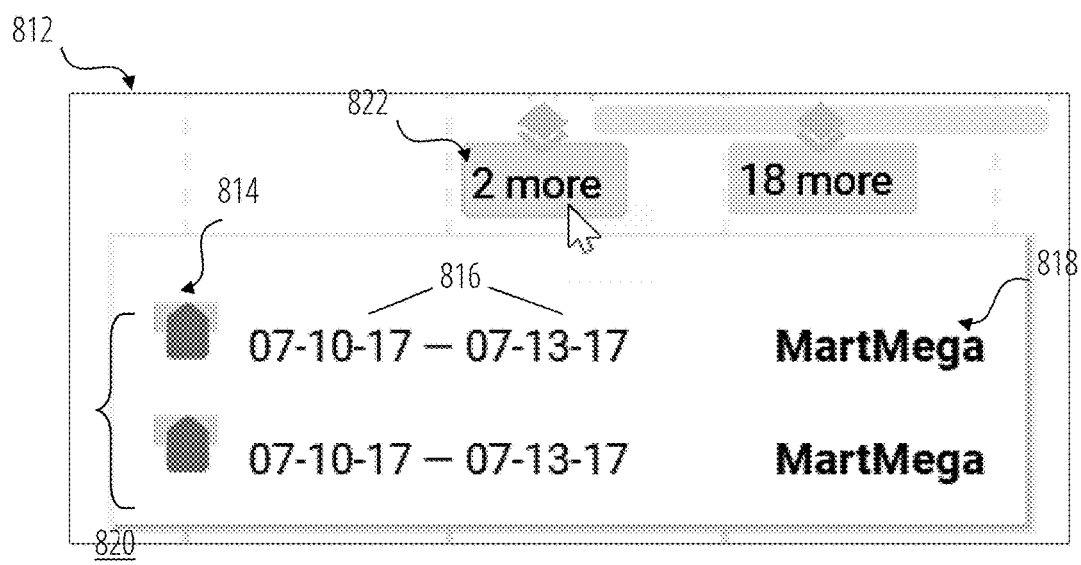
FIG. 8B illustrates a tooltip in accordance with one embodiment.

FIG. 8B shows a tooltip 812 that reveals details of the two constituent events 820 that the overflow event 822 labelled as "2 more" collapses. The tooltip 812 shows the type of event 814 (indicated by a symbol and symbol color), the dates 816 (start and end) as well as the labels 818 (in this example, "MartMega"). As the constituent events labels are textual, the overflow event 822 is itself labeled with the number of events it collapses: "2 more" (here, no sum is possible).

Figure 9:
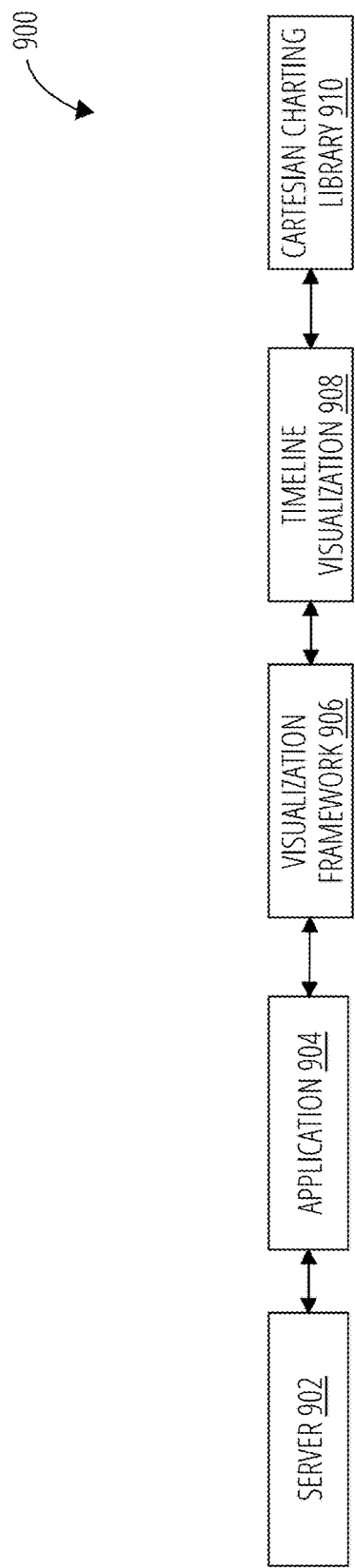
FIG. 9 illustrates an overall system architecture in accordance with one embodiment.

FIG. 9 illustrates an overall system architecture 900 in accordance with one embodiment, in which a server 902 is in communication with application 904. Server 902 may be a data server that provides access to database content. Application 904 can be application client software, that connects to the server 902 and allows a user to query and perform actions on the data. The application may have a table view as the default view.

Application 904 communicates with visualization framework 906, which is a component of the application 904 that allows users to visualize data in a format other than table view. Examples of other formats include charts, networks, timelines, and so forth.

Visualization framework 906 communicates with timeline visualization 908, which receives data and settings from the visualization framework 906. Timeline visualization 908 displays a list of events in chronological order on a linear scale along one or more time axes.

Timeline visualization 908 is in communication with cartesian charting library 910, which is a library that allows plotting of points, lines, curves, and axes, based on the Cartesian system.

In summary, data and algorithm results are stored in a large database (for example, database 118 in FIG. 1). The data can be composed of multiple tables with relationships between the tables. These tables can be processed (queries, filters, composites . . . ) and viewed either as worksheets or as visualizations. The visualization framework 906 acts as a middleware between the application 904 and the timeline visualization 908. Visualization framework 906 allows an author to pick a visualization that is compatible with the currently authored worksheet (number and type of columns). For example, a line chart can only be authored on a worksheet that has at minimum of two columns: x and y. Visualization framework 906 also allows an author to configure the visualization mappings (see FIG. 6A, for example). Visualization framework 906 also allows authors to configure the style/settings of the visualization (see FIG. 6B for example). Visualization framework 906 sends the mapped worksheet data (i.e. subset of the worksheet) and settings to the timeline visualization 908 which renders the data for visualization (see FIG. 8A, for example). Finally, timeline visualization 908 can drill down into the rendered visualization, upon request (see FIG. 8B, for example).

According to FIG. 9, the information flows primarily in one direction: from the visualization framework 906 to the timeline visualization 908. One of the actions that the timeline visualization 908 can perform through the visualization framework 906 is to request rows progressively (rather than receive them all at once) and perform a drill (which is equivalent to clicking a hyperlink that targets a worksheet, form or another visualization).

Figure 10:
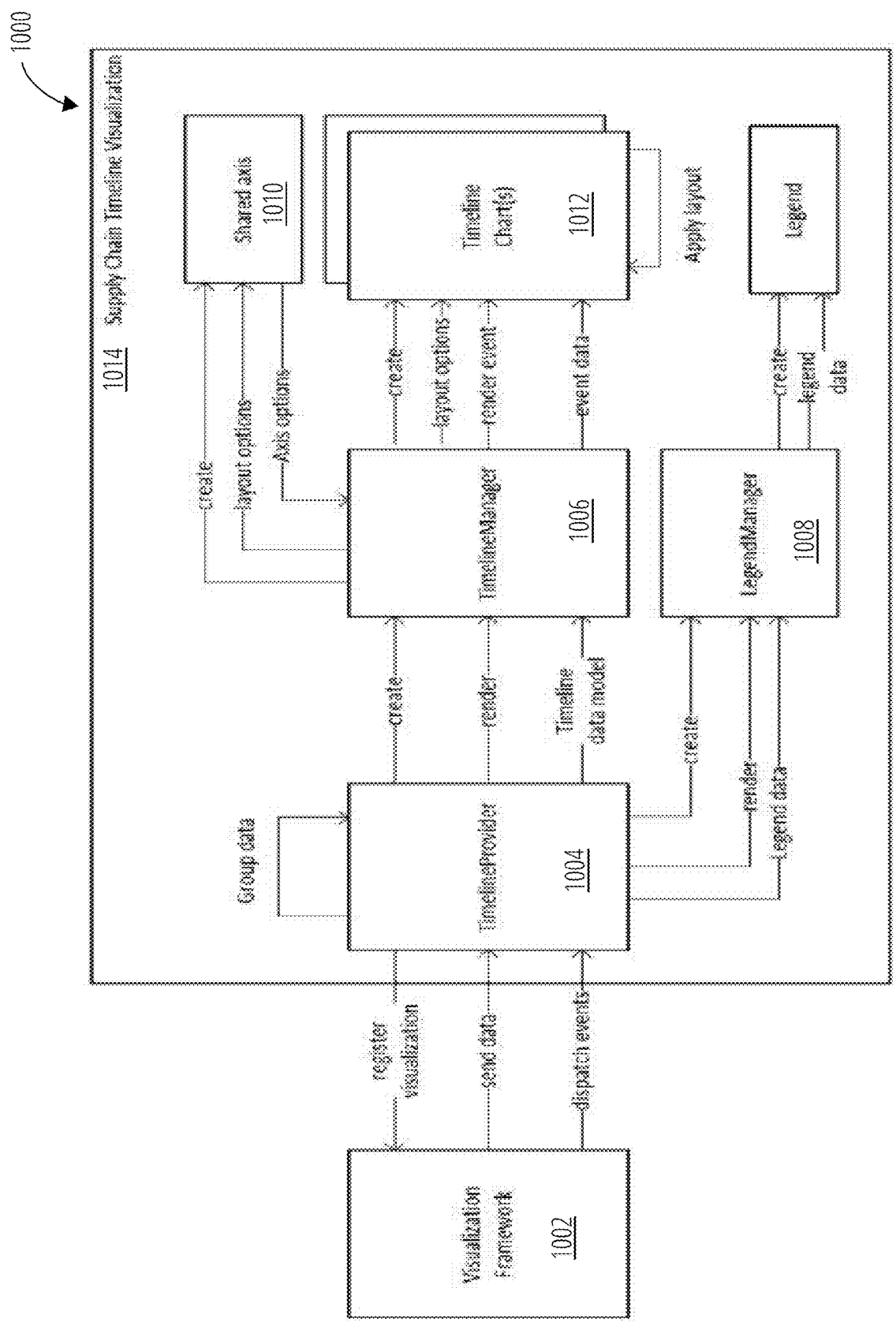
FIG. 10 illustrates a system architecture diagram in accordance with one embodiment.

FIG. 10 illustrates a system architecture diagram 1000 in accordance with one embodiment. In FIG. 10, interaction between visualization framework 1002 and timeline visualization 1014 are shown, along with further details of components that comprise the timeline visualization 1014.

The visualization framework 1002 can be a Software Development Kit (SDK) that enables the authoring of dynamic visualizations. Once timeline visualization 1014 registers with visualization framework 1002, the visualization framework 1002 is aware of the data requirements of the timeline visualization 1014 (that is, the number and type of columns), and makes the visualization available when a compatible worksheet is authored. When the timeline visualization 1014 is chosen by the author, and columns are mapped to the required data mappings, the visualization framework 1002 sends rows of data to the timeline visualization 1014.

Visualization framework 1002, in general, enables mapping of compatible table columns to generic fields of a visualization. For example, in a line chart, generic fields are X and Y coordinates; in a network visualization, generic fields are Parent, Child, Node Color, Link Width, etc. In the embodiment shown in FIG. 10, the generic fields are Instant Event Date, Instant Event Label, Instant Event tooltip, and so on, for timeline visualization 1014. Visualization framework 1002 also manages configuration options, such as mappings, column options (color, shape) and visualization options (user-defined threshold). Timeline visualization 1014 allows drilling onto another table or visualization.

Timeline visualization 1014 includes timeline provider 1004, timeline manager 1006, legend manager 1008, shared axis 1010 and timeline chart(s) 1012. The timeline provider 1004 massages the data from the mapped worksheet, to generate a timeline data model. The timeline manager 1006 is responsible for instantiating the shared axis and as many timelines as there are in the data model. The legend manager 1008 takes legend data as input and generates a widget that contains the legend of the chart. The shared axis is a widget instantiated by the timeline manager 1006—it renders into a common time axis on top of the visualization, that covers the entire time window between the first and last event. Below the time axis, one timeline chart appears for each entity in the data model. Timeline chart(s) 1012 are composed of a horizontal axis, with top-down events above and bottom-up events below the time axis.

Visualization framework 1002 sends mapped worksheet data and dispatches events to timeline visualization 1014. That is, visualization framework 1002 notifies the timeline provider of any data or configuration change. Visualization framework 1002 sends the provider new data after mappings are updated, and likewise, new settings after the configuration is updated.

The data and events are received by timeline provider 1004, which transforms the worksheet data received from the visualization framework 1002 into a format suitable for rendering by the timeline chart(s) 1012. The timeline manager 1006 acts as a manager for multiple charts layers, enabling a common HTML Document Object Model (DOM) for all layers. All events (instant events and interval events) are organized by a series of event of a same type, and rendered on the timeline chart of the entity they belong to.

Figure 11:
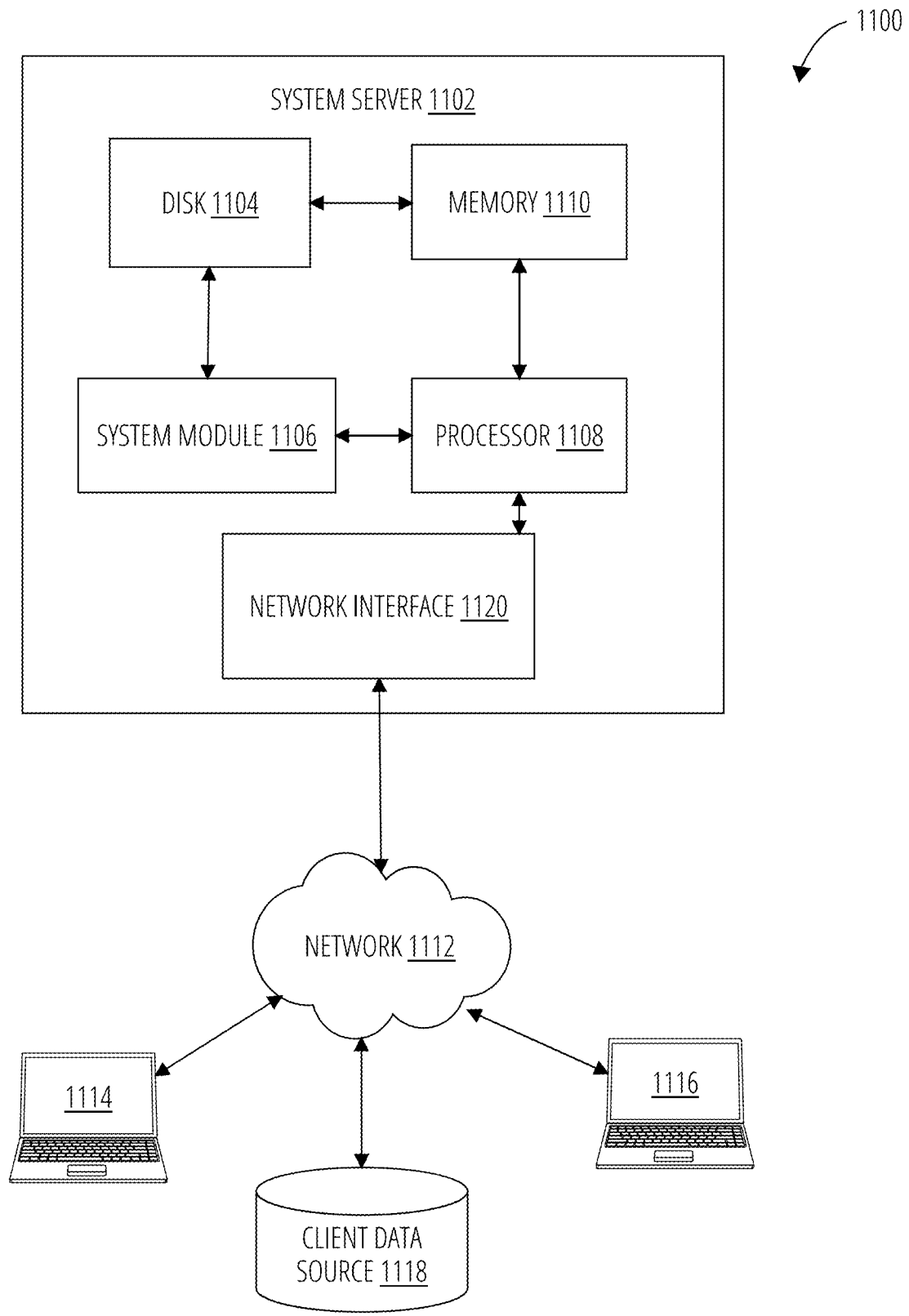
FIG. 11 illustrates a system in accordance with one embodiment.

FIG. 11 illustrates a system 1100 in accordance with one embodiment.

System 1100 includes a system server 1102, client data source 1118, and one or more devices 1114 and 1116. System server 1102 can include a memory 1110, a disk 1104, a processor 1108 and a system module 1106. While one processor 1108 is shown, the system server 1102 can comprise one or more processors. In some embodiments, memory 1110 can be volatile memory, compared with disk 1104 which can be non-volatile memory. In some embodiments, system server 1102 can communicate with client data source 1118 and one or more external devices 1114 and 1116 via network 1112.

System 1100 can also include additional features and/or functionality. For example, system 1100 can also include additional storage (removable and/or non-removable) including, but not limited to, magnetic or optical disks or tape. Such additional storage is illustrated in FIG. 11 by memory 1110 and disk 1104. Storage media can include volatile and nonvolatile, removable and non-removable media implemented in any method or technology for storage of information such as computer-readable instructions, data structures, program modules or other data. Memory 1110 and disk 1104 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1100. Any such non-transitory computer-readable storage media can be part of system 1100.

Communication between system server 1102, client data source 1118 and one or more external devices 1114 and 1116 via network 1112 can be over various network types. In some embodiments, the processor 1108 may be disposed in communication with network 1112 via a network interface 1120. The network interface 1120 may communicate with the network 1112. The network interface 1120 may employ connection protocols including, without limitation, direct connect, Ethernet (e.g., twisted pair 10/40/900 Base T), transmission control protocol/internet protocol (TCP/IP), token ring, IEEE 802.11a/b/g/n/x, etc. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 1100 may take place over hard-wired, cellular, Wi-Fi or Bluetooth networked components or the like. In some embodiments, one or more electronic devices of system 1100 may include cloud-based features, such as cloud-based memory storage.

Client data source 1118 may provide a variety of raw data from a user.

Using the network interface 1120 and the network 1112, the system server 1102 may communicate with one or more devices 1114 and 1116. These devices 1114 and 1116 may include, without limitation, personal computer(s), server(s), various mobile devices such as cellular telephones, smartphones (e.g., Apple iphone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like.

Using network 1112, system server 1102 can retrieve data from client data source 1118. The retrieved data can be saved in memory 1110 or disk 1104. In some embodiments, system server 1102 also comprise a web server, and can format resources into a format suitable to be displayed on a web browser.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A computer-implemented method comprising:
applying, by a processor, a set of mappings and one or more settings to a worksheet data, thereby producing a mapped worksheet data;
creating, by the processor, a data model based on the mapped worksheet data, the data model comprising timeline data and legend data;
computing, by the processor, based on the timeline data, one or more timelines, each timeline comprising a timeline axis, a second axis, each timeline associated with one or more events, wherein for each timeline, the computer-implemented method comprises:
computing by the processor, a position for each event, each event being categorized as a first type of event or a second type of event,
displaying, by the processor, each event in chronological order along the timeline axis, the first type of event being displayed on a first side of the timeline axis and the second type of event being displayed on a second side of the timeline axis opposite the first side; and
displaying, by the processor, a subset of the one or more events displaced along the second axis in a non-chronological order according to an attribute associated with the subset of the one or more events.

2. The computer-implemented method of claim 1, further comprising: listening, by the processor, for one or more user input events.

3. The computer-implemented method of claim 1, wherein:
the set of mappings comprise a data mapping and a style mapping;
the data mapping comprises one or more categories of mappings; and the computer-implemented method further comprises: applying, by the processor, the data mapping to one or more columns of the worksheet data.

4. The computer-implemented method of claim 3, wherein the style mapping customizes a symbol and a colour for each series of events of the one or more events.

5. The computer-implemented method of claim 3, wherein the one or more categories of mappings comprises a timeline mapping, an instant event mapping, and an interval event mapping;
the instant event mapping and the interval event mapping each comprise a date mapping, a label mapping and a tooltip mapping;
the date mapping of the instant event mapping accepts one or more date columns of the worksheet data, each date column representing a single series of a type of instant event;
the date mapping of the interval event mapping accepts a pair of date columns of the worksheet data, each pair of date columns representing a single series of a type of interval event;
the label mapping accepts one or more attribute columns of the worksheet data, a content of each of the one or more attribute columns displayed on a label associated with a respective event; and
the tooltip mapping accepts one or more item identifiers.

6. The computer-implemented method of claim 1, wherein there are a plurality of timelines, and the computer-implemented method further comprises: displaying, by the processor, vertical stacking of the timelines.

7. The computer-implemented method of claim 1, further comprising:
limiting, by the processor, displacement of events along the second axis based on input by a user;
creating, by the processor, an overflow of one or more hidden events that exceed the displacement.

8. A computing apparatus comprising: a processor; and a memory storing instructions that, when executed by the processor, configure the computing apparatus to:
apply, by the processor, a set of mappings and one or more settings to a worksheet data, thereby producing a mapped worksheet data;
create, by the processor, a data model based on the mapped worksheet data, the data model comprising timeline data and legend data;
compute, by the processor, based on the timeline data, one or more timelines, each timeline comprising a timeline axis, a second axis, each timeline associated with one or more events, wherein for each timeline, the computing apparatus is further configured to:
compute by the processor, a position for each event, each event being categorized as a first type of event or a second type of event,
display, by the processor, each event in chronological order along the timeline axis, the first type of event being displayed on a first side of the timeline axis and the second type of event being displayed on a second side of the timeline axis opposite the first side; and
display, by the processor, a subset of the one or more events displaced along the second axis in a non-chronological order according to an attribute associated with the subset of the one or more events.

9. The computing apparatus of claim 8, wherein the instructions further configure the computing apparatus to:
listen, by the processor, for one or more user input events.

10. The computing apparatus of claim 8, wherein:
the set of mappings comprise a data mapping and a style mapping;
the data mapping comprise one or more categories of mappings; and the instructions further configure the computing apparatus to: apply, by the processor, the data mapping to one or more columns of the worksheet data.

11. The computing apparatus of claim 10, wherein the style mapping customizes a symbol and a colour for each series of events of the one or more events.

12. The computing apparatus of claim 10, wherein the one or more categories of mappings comprises a timeline map, an instant event mapping, and an interval event mapping;
the instant event map and the interval event mapping each comprise a date mapping, a label mapping and a tooltip mapping;
the date mapping of the instant event mapping accepts one or more date columns of the worksheet data, each date column representing a single series of a type of instant event;
the date mapping of the interval event mapping accepts a pair of date columns of the worksheet data, each pair of date columns representing a single series of a type of interval event;
the label map accepts one or more attribute columns of the worksheet data, a content of each of the one or more attribute columns displayed on a label associated with a respective event; and
the tooltip map accepts one or more item identifiers.

13. The computing apparatus of claim 8, wherein there are a plurality of timelines, and the computing apparatus further comprises: display, by the processor, vertical stacking of the timelines.

14. The computing apparatus of claim 8, wherein the instructions further configure the computing apparatus to: limit, by the processor, displacement of events along the second axis based on input by a user; create, by the processor, an overflow of one or more hidden events that exceed the displacement.

15. A non-transitory computer-readable storage medium including instructions that when executed by a computer, cause the computer to:
apply, by a processor, a set of mappings and one or more settings to a worksheet data, thereby producing a mapped worksheet data;
create, by the processor, a data model based on the mapped worksheet data, the data model comprising timeline data and legend data;
compute, by the processor, based on the timeline data, one or more timelines, each timeline comprising a timeline axis, a second axis, each timeline associated with one or more events, wherein for each timeline, wherein the instructions further configure the computer to:
compute by the processor, a position for each event, each event being categorized as a first type of event or a second type of event,
display, by the processor, each event in chronological order along the timeline axis, the first type of event being displayed on a first side of the timeline axis and the second type of event being displayed on a second side of the timeline axis opposite the first side; and display, by the processor, a subset of the one or more events displaced along the second axis in anon-chronological order according to an attribute associated with the subset of the one or more events.

16. The non-transitory computer-readable storage medium of claim 15, wherein the instructions further configure the computer to:
listen, by the processor, for one or more user input events.

17. The non-transitory computer-readable storage medium of claim 15, wherein:
the set of mappings comprise a data mapping and a style mapping;
the data mapping comprises one or more categories of mappings; and
the instructions further configure the computer to:
applying, by the processor, the data mapping to one or more columns of the worksheet data.

18. The non-transitory computer-readable storage medium of claim 17, wherein the style mapping customizes a symbol and a colour for each series of events of the one or more events.

19. The non-transitory computer-readable storage medium of claim 17, wherein the one or more categories of mappings comprises a timeline map, an instant event mapping, and an interval event mapping;
the instant event map and the interval event mapping each comprise a date mapping, a label mapping and a tooltip mapping;
the date mapping of the instant event mapping accepts one or more date columns of the worksheet data, each date column representing a single series of a type of instant event;
the date mapping of the interval event mapping accepts a pair of date columns of the worksheet data, each pair of date columns representing a single series of a type of interval event;
the label map accepts one or more attribute columns of the worksheet data, a content of each of the one or more attribute columns displayed on a label associated with a respective event; and
the tooltip map accepts one or more item identifiers.

20. The non-transitory computer-readable storage medium of claim 15, wherein there are a plurality of timelines, and wherein the instructions further configure the computer to:
display, by the processor, vertical stacking of the timelines.

21. The non-transitory computer-readable storage medium of claim 15, wherein the instructions further configure the computer to:
limit, by the processor, displacement of events along the second axis based on input by a user;
create, by the processor, an overflow of one or more hidden events that exceed the displacement.

* * * * *